United States Patent
Luh (10) Patent No.: US 7,121,967 B2
(45) Date of Patent: Oct. 17, 2006

(54) CONTROL CIRCUIT AND METHOD FOR GENERATING A CONTROL SIGNAL FOR CONTROLLING A CONTINUOUSLY VARIABLE BELT TRANSMISSION

(75) Inventor: Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 10/469,413

(22) PCT Filed: Nov. 29, 2002

(86) PCT No.: PCT/DE02/04384

§ 371 (c)(1),
(2), (4) Date: Aug. 28, 2003

(87) PCT Pub. No.: WO03/060352

PCT Pub. Date: Jul. 24, 2003

(65) Prior Publication Data

US 2004/0235595 A1    Nov. 25, 2004

(30) Foreign Application Priority Data

Dec. 29, 2001  (DE) .............................. 101 64 490

(51) Int. Cl.
*F16H 9/18* (2006.01)

(52) U.S. Cl. ....................................................... 474/18
(58) Field of Classification Search .................. 474/11, 474/12, 17, 18, 28
See application file for complete search history.

(56) References Cited

U.S. PATENT DOCUMENTS

| 4,458,318 A | * | 7/1984 | Smit et al. | .................. 701/51 |
| 4,721,019 A |   | 1/1988 | Nakamura et al. | |
| 5,947,862 A |   | 9/1999 | Knapp et al. | |
| 6,311,113 B1 | * | 10/2001 | Danz et al. | ................... 701/57 |
| 2004/0102266 A1 | * | 5/2004 | Bai | ............................ 474/18 |

FOREIGN PATENT DOCUMENTS

| DE | 195 48 722 | 7/1996 |
| DE | 196 49 483 | 6/1998 |
| DE | 199 28 292 | 6/2000 |

* cited by examiner

*Primary Examiner*—Vicky A. Johnson
(74) *Attorney, Agent, or Firm*—Walter Ottesen (57) ABSTRACT

The invention relates to a control circuit for generating a control signal (I) for controlling the transmission ratio adjustment of a belt transmission continuously adjustable with respect to its transmission ratio. The belt transmission includes a drive end (7), an output end (8) and a primary valve (15) for adjusting the transmission ratio. The primary valve (15) is driven by the control signal (I). The control circuit includes means for generating the control signal (I) in dependence upon operating parameters of the vehicle transmitted to the control circuit. It is suggested that the control signal (I) is generated in dependence upon a value (y) for a desired speed of the transmission ratio change or from a quantity derived therefrom. The value (y) for the desired speed of the transmission ratio change is determined from the operating parameters transmitted to the control circuit.

19 Claims, 10 Drawing Sheets

CONTROL CIRCUIT AND METHOD FOR GENERATING A CONTROL SIGNAL FOR CONTROLLING A CONTINUOUSLY VARIABLE BELT TRANSMISSION

RELATED APPLICATION

This application is the national stage of PCT/DE 02/04384, filed Nov. 29, 2002, designating the United States and claiming priority from German patent application no. 101 64 490.6, filed Dec. 29, 2001, the entire contents of which are incorporated herein by reference.

FIELD OF THE INVENTION

The invention relates to a control circuit for generating a control signal for controlling a belt transmission controllable continuously with respect to its transmission ratio and a method for generating a control signal.

BACKGROUND OF THE INVENTION

A belt transmission, which is continuously variable with respect to its transmission ratio, has a drive end, an output end and a primary valve for adjusting the transmission ratio and is, for example, known from DE 196 49 483 A1. The primary valve is driven by a control signal. A control circuit generates a control signal in dependence upon operating parameters of the vehicle transmitted to the control circuit. These operating parameters include, for example, the primary rpm, the secondary rpm and the position of the accelerator pedal.

SUMMARY OF THE INVENTION

With the control circuit according to the invention, advantages are achieved which can significantly increase the speed with which an upshifting of the transmission ratio of the continuously variable transmission can take place. Advantageously, the control signal, which adjusts the transmission ratio, is generated in dependence upon the desired speed of the transmission ratio change or is generated from a quantity derived therefrom. The value for the desired speed of the transmission ratio change is determined from the operating parameters transmitted to the control circuit.

Advantageously, the control circuit can determine the desired speed of the change of transmission ratio or the desired transmission ratio gradient in dependence upon a wanted transmission ratio or a desired transmission ratio. A desired primary rpm functions as an interface to the driving program. Because of the use of a filtered reference rpm to compute the wanted transmission ratio, vibrations of the drive train have no influence on the control of the transmission ratio.

By avoiding a contact force at the primary end which is too small at standstill of the variator, a slip of the belt part is avoided for high torques transmitted to the primary end.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
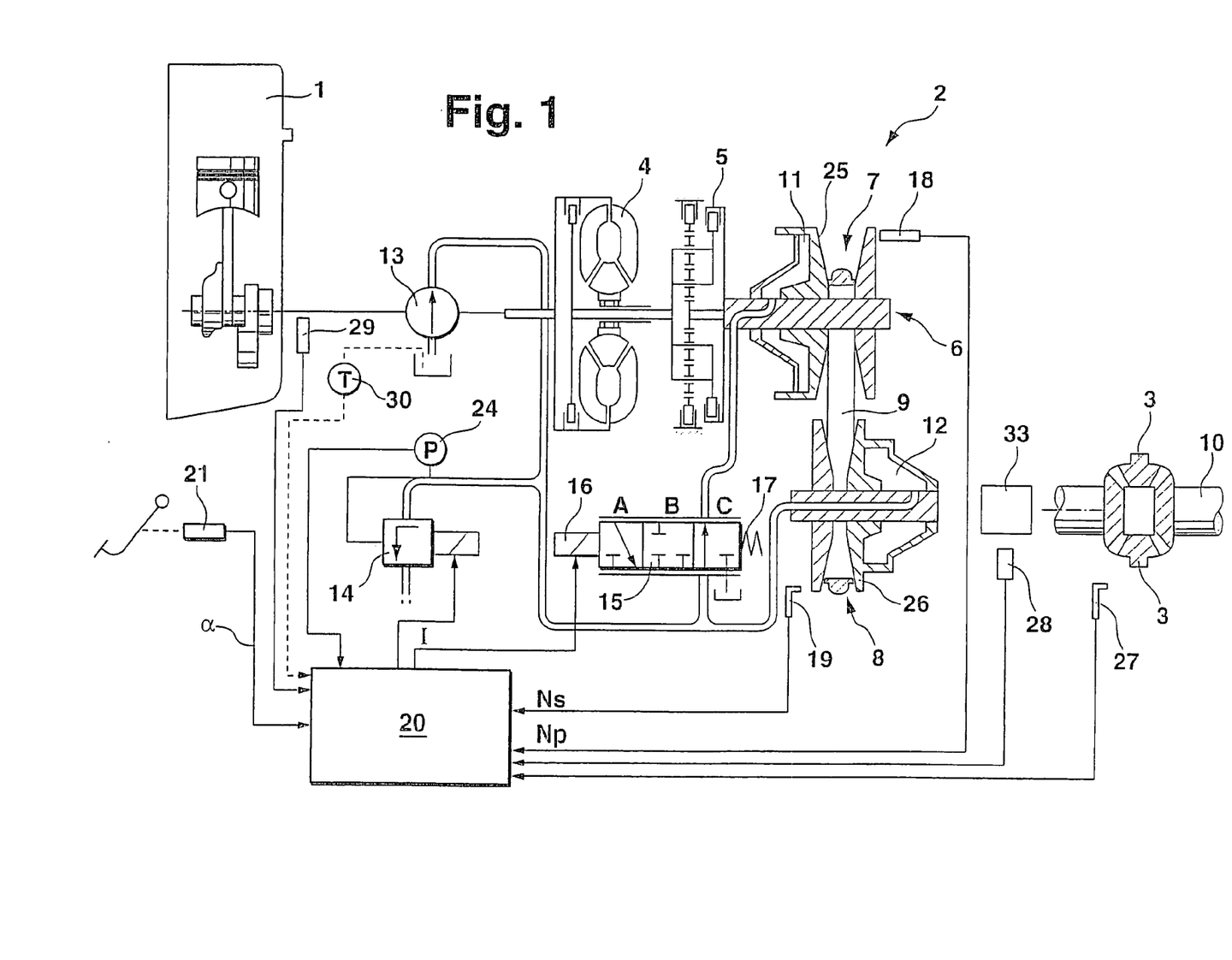
FIG. 1 shows an overview diagram of a continuously variable transmission.

In FIG. 1, reference numeral 2 identifies a continuously variable belt transmission for the purpose of transmitting force from the motor 1 to the drive shafts 3 of the wheels of a motor vehicle. A continuously variable transmission of this kind has, for example, a torque converter 4 and a planetary transmission with clutches 5 for forward travel switchover and rearward travel switchover. The clutches 5 are arranged between the engine 1 and a variator 6. The variator 6 preferably includes a drive-end conical disc set 7 and an output-end conical disc set 8. Each conical disc set comprises an axially fixed and an axially movable disc provided as an actuating member. Accordingly, the drive-end conical disc set 7 includes, for example, the axially displaceable conical disc 25 and the output-end conical disc set 8 includes the axially displaceable conical disc 26. The axially displaceable conical discs 25 and 26 are hydraulically adjustable and have, for this purpose, the fluid chambers 11 and 12 which, for example, can be filled with oil as a fluid. The output-end conical disc set 8 is connected to the drive shafts 3 of the wheels via a compensating transmission 10. At the output end, switchable transmission stages 33 can be additionally provided between the conical disc set 8 and the drive shaft 3 of the wheels. With the aid of a belt part 9 configured as a chain or as a thrust member belt, the force is transmitted from the drive-end conical disc set 7 to the output-end conical disc set 8. The transmission ratio of the variator 6 changes between a high start-drive transmission ratio at the position "low" and a low transmission ratio in the position "overdrive" because of the simultaneous variation of the axially moveable discs (25, 26) on the drive disc set and the output disc set.

The drive-end primary fluid chamber and the output-end secondary fluid chamber can, for example, be supplied with pressurized oil via an oil pump 13. Of course, another fluid can be used. For the pressurized oil supply, the oil pump 13 can, for example, run with the rpm of the internal combustion engine 1. The tension of the belt part 9 can be adjusted with the aid of a pressure limiting valve 14 which regulates the oil pressure in the secondary fluid chamber 12. The transmission ratio is adjusted with the aid of a primary valve 15 at the primary end. The primary valve is configured as a proportional valve.

The primary valve 15 is configured as a proportional valve and can discharge oil from the drive-end fluid chamber 11 in the position A and thereby reduce pressure whereby the transmission ratio is shifted in the direction of "low". In the position C, oil flows into the drive-end fluid chamber 11 whereby the transmission ratio changes in the direction of "overdrive" and the pressure in the drive-end fluid chamber 11 increases. In the position B of the proportional valve 15, the fluid chamber 11 is sealed, that is, virtually no oil can flow into or out of the fluid chamber 11. The primary valve 15 can be driven directly or also via a precontrol valve in a manner known per se. In the embodiment described here, a force on the valve slide is generated by a current in a magnet 16 resulting from the generated control signal I. A specific position of the primary valve 15 adjusts via the spring 17 present on the valve disc. This means that the current pregiven by the control signal I through the magnet 16 determines the position of the primary valve 15 and therefore determines the opening cross section of the valve. This current is pregiven by the control signal I and the primary valve 15 is configured as a proportional valve.

As shown in FIG. 1, an rpm transducer 18 detects the primary rpm $N_p$ of the drive-end conical disc set 7 and an rpm transducer 19 detects the secondary rpm $N_s$ of the output-end conical disc set 8. Furthermore, a sensor 27 is shown which detects the driving speed $V_{Fz}$ and a sensor 24 is shown which detects the secondary pressure $P_s$. The secondary pressure $P_s$ also acts on the secondary output-end fluid chamber 12. The signals for the primary rpm $N_p$, the secondary rpm $N_s$, the vehicle speed $V_{Fz}$ and the secondary pressure $P_s$ are all supplied to a transmission control apparatus 20 wherein a control circuit is arranged. The control circuit can also be arranged in a motor control apparatus or even in several control apparatuses or control modules connected to each other. The data, which are detected by the sensors and transmitted to the control circuit, are referred to in the following as operating parameters. The control circuit of the transmission control apparatus 20 generates a control signal I which adjusts the primary valve 15. The control signal I is generated in dependence upon the operating parameters for the driving state of the motor vehicle and are supplied to the control circuit.

As shown in FIG. 1, for example, a sensor 21 for determining the position α of the accelerator pedal actuated by the driver and a sensor 29 for transmitting a signal for the engine rpm $N_{mot}$ are also connected to the control circuit. In the event that shiftable transmission stages 33 are present, means 28 for detecting the transmission ratio $i_{ab}$ of this transmission stage can be present. The transmission ratio i of the variator 6 must not necessarily be derived from the primary rpm $N_p$ and the secondary rpm $N_s$ and can, in lieu thereof, also be measured with other sensors. For example, for this purpose, a sensor for measuring the axial displacement of the primary moveable conical disc 25 can be provided. The signals for the operating parameters, especially the signals for the vehicle speed, the engine rpm and the position of the accelerator pedal can be transmitted to the control apparatus 20 also by another control apparatus, for example, by a CAN-bus. The vehicle speed can also be obtained with the aid of an observer from the wheel rpm signals and, if required, additional signals. It is also possible to use, in lieu of the vehicle speed, the output rpm of the transmission. Additionally, a temperature sensor 30 can be provided which transmits a signal for the temperature T of the pressurized oil to the control apparatus 20.

Furthermore, a signal for the engine output torque $M_{mot}$ is transmitted to the control apparatus or is computed from the operating parameters, which are transmitted to the control circuit, in a manner known per se. A method for detecting the engine output torque $M_{mot}$ is, for example, described in U.S. Pat. No. 6,623,388.

Figure 2A:
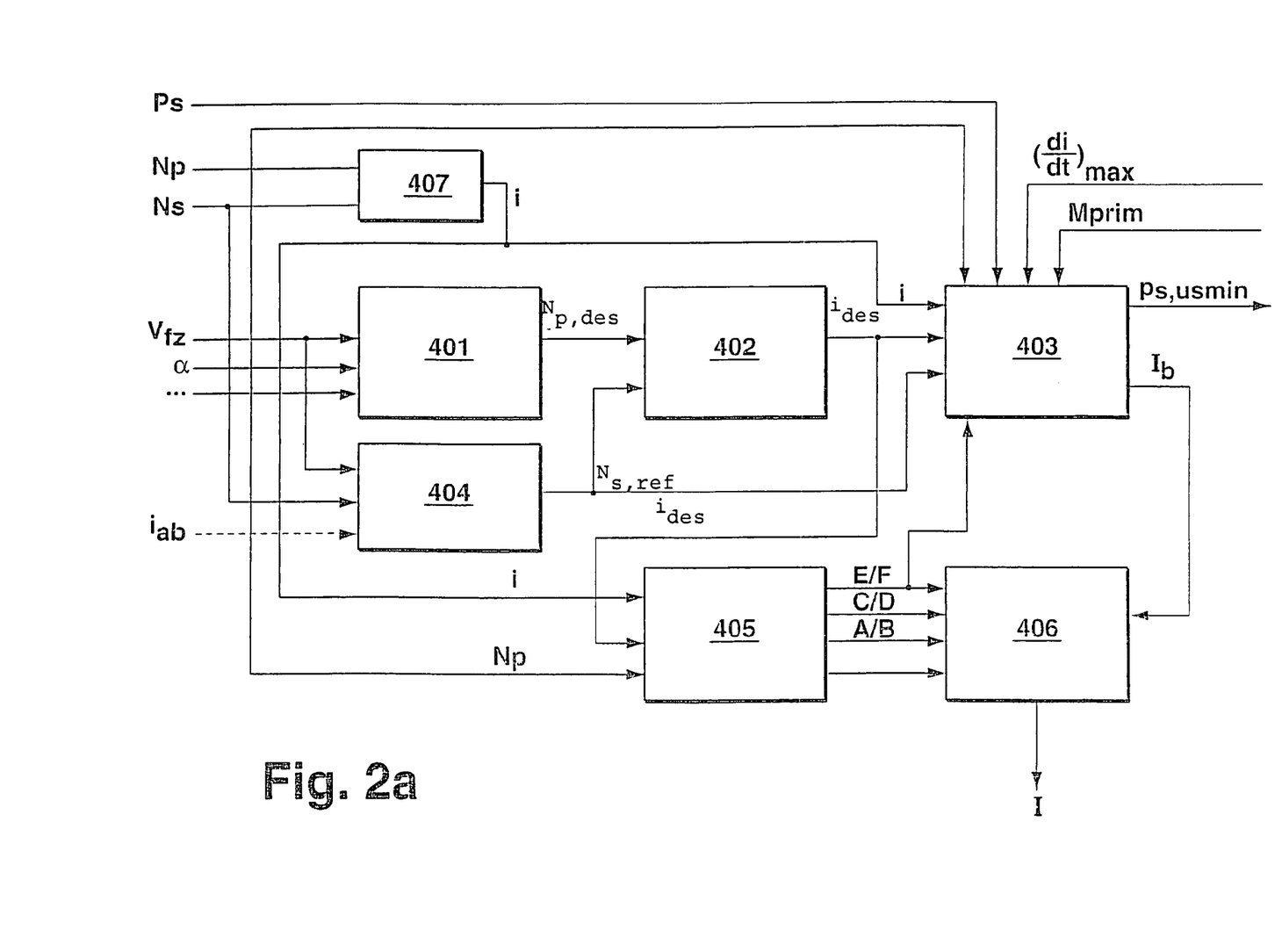
FIGS. 2a and 2b show a block circuit diagram of the control circuit; and, FIGS. 3 to 10 show individual parts of the control circuit shown in FIGS. 2a and 2b.
Figure 2B:
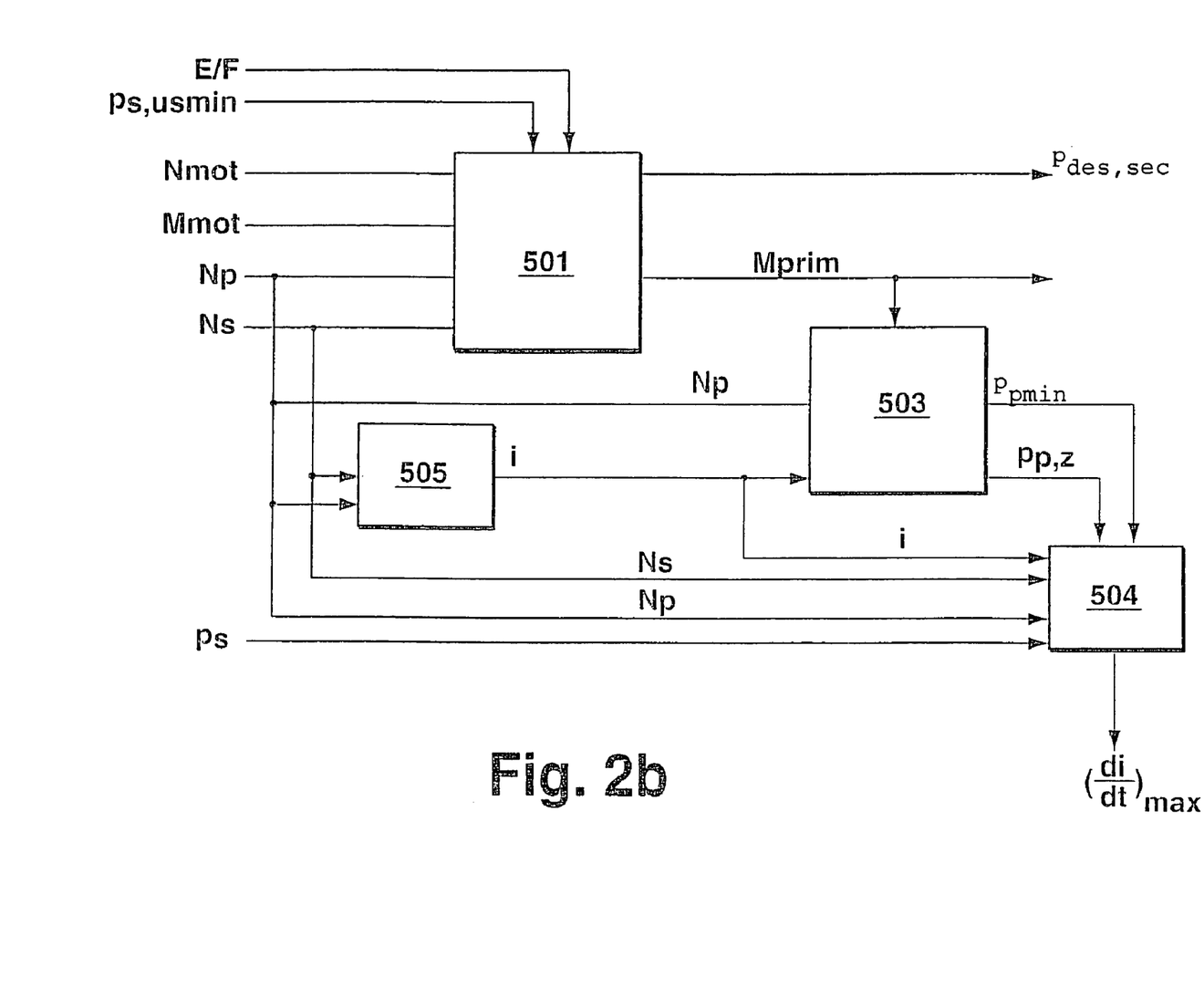

FIG. 2a schematically shows, in an overview, the detailed configuration of a part of the control circuit, which is arranged in the control apparatus 20, for adjusting the transmission ratio. In FIG. 2b, a further circuit part is shown in overview which functions, inter alia, for the adjustment of the tension of the belt part of the belt transmission.

Block 401 in FIG. 2a computes a desired primary rpm $N_{p,des}$ from different operating parameters transmitted to the control apparatus such as the accelerator pedal position α and the vehicle speed $V_{Fz}$. The computed desired primary rpm $N_{p,des}$ corresponds to a wanted transmission ratio of the variator 6.

In block 404, a reference rpm signal $N_{s,ref}$ is formed from the following: the value for the vehicle speed $V_{Fz}$, the value for the secondary rpm $N_s$ and (in the event that shiftable transmission stages are present) the value for the transmission ratio $i_{ab}$ of the output-end transmission stages 33. This is explained in greater detail hereinafter with reference to FIG. 6.

In block 402, the wanted transmission ratio $i_{des}$ of the variator 6 is computed from the desired primary rpm $N_{p,des}$, which is transmitted from block 401, and the value for the reference rpm $N_{s,ref}$, which is transmitted from the block 404. The desired transmission ratio $i_{des}$ is transmitted to the blocks 403 and 405. It is, however, also possible to make available the desired transmission ratio $i_{des}$ via a driving program.

In block 405, three status signals A/B, C/D and E/F are formed which correspond to different modes of operation of the belt transmission 2. The operation of the block 405 is explained in greater detail below with respect to FIG. 3.

The block 407 computes the transmission ratio according to the equation:

$$i = N_p/N_s$$

from the values for the primary rpm $N_p$ of the drive end 7 and the secondary rpm $N_s$ of the output end 8.

The central block 403 computes a current signal $I_b$ which is transmitted to the block 406. The current signal $I_b$ is computed by block 403 from the values for the following: the actual transmission ratio i, the desired transmission ratio $i_{des}$, the reference rpm $N_{s,ref}$, the secondary pressure $P_s$, the primary rpm $N_p$ and the values for the torque $M_{prim}$ operating at the primary end and a value for the maximum permissible change of the transmission ratio (di/dt)max in dependence upon the state signal E/F. The current signal $I_b$ corresponds to a preliminary actuating signal for the primary valve 15. For the computation, the usual algorithms for the position control of hydraulic cylinders are used. The function of the block 403 is explained in detail in FIG. 7 and is described further hereinafter. The values for the primary end operating torque $M_{prim}$ and the maximum permissible change of the transmission ratio or for the maximum permissible transmission ratio gradient (di/dt)max are supplied to block 403 by the circuit part shown in FIG. 2b. Furthermore, the block computes a value for a minimum secondary pressure $P_{s,USMIN}$, which is required in order to be able to adjust a wanted volume flow $Q_{p,des}$ into the primary oil chamber 11 of the primary valve, especially, for the case of a rapid upshifting.

Figure 4:
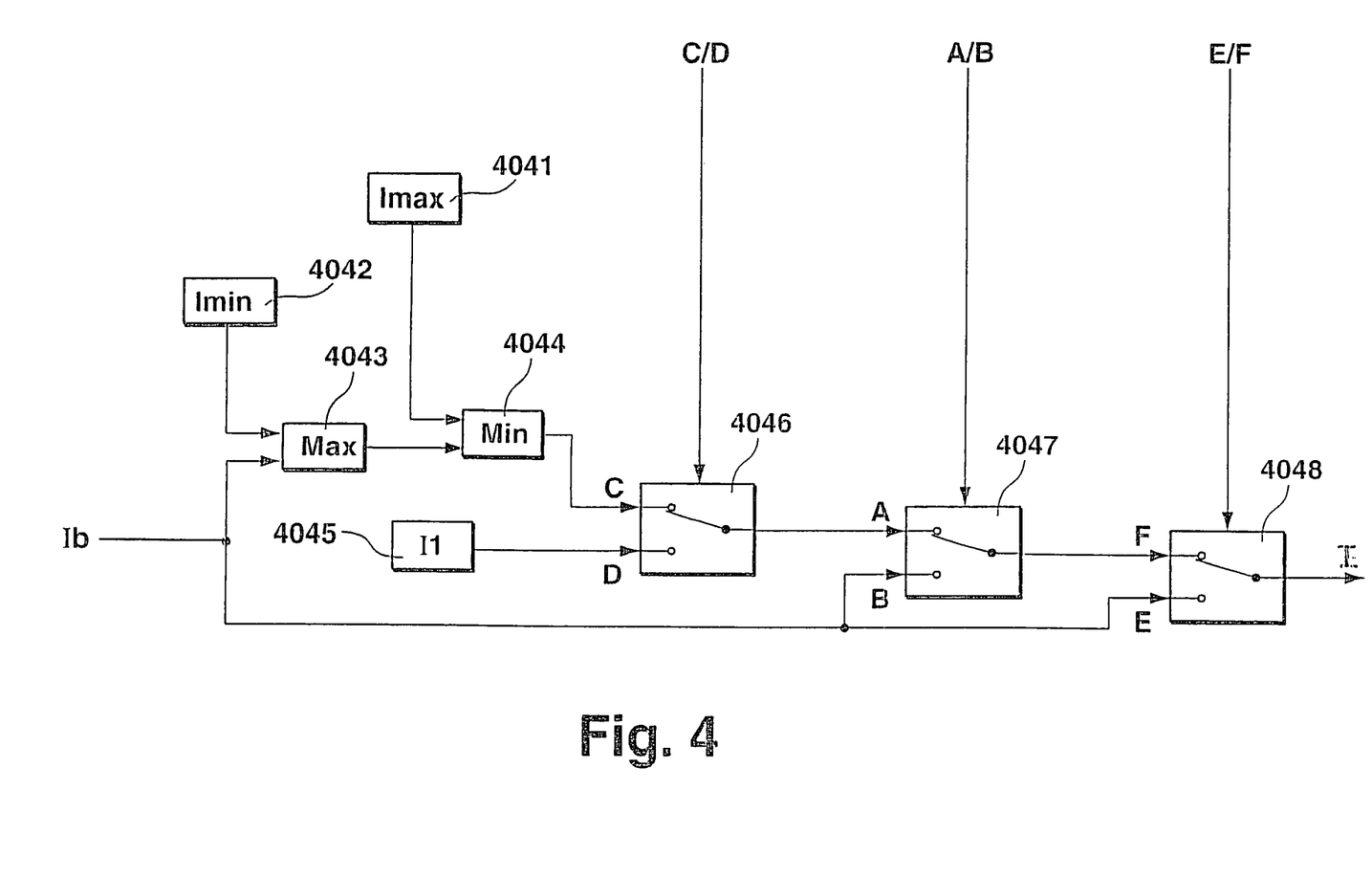

In block 406, the current signal $I_b$ is limited in dependence upon the signals A/B, C/D and E/F generated by the block 405 as will be explained in greater detail with respect to FIG. 4.

FIG. 2b shows a circuit part which computes a desired secondary pressure $P_{des,sec}$ for the secondary oil chamber 12 in block 501 from the parameters, which are transmitted to the control apparatus, namely: for the primary rpm $N_p$, the secondary rpm $N_s$, the torque $M_{mot}$, the rpm $N_{mot}$ at the engine output end and the value for the minimum secondary pressure $P_{s,USMIN}$, which is transmitted from the block 403 in FIG. 2a, and the state signal E/F transmitted from block 405 in FIG. 2a. The operation of the block 501 is explained further below with respect to FIG. 8.

Block 505 computes the actual transmission ratio i from the primary rpm $N_p$ and the secondary rpm $N_s$. This value can, however, also be supplied by the block 407 in FIG. 2a or by a further sensor.

The block 503 computes the values $P_{pmin}$ and $p_{p,z}$ from the values $M_{prim}$, $N_p$ and i. The block 503 is explained with respect to FIG. 9.

The block 504 computes the maximum permissible transmission ratio gradient (di/dt)max from the signals $N_p$, $N_S$, i, $p_s$ and the values $P_{pmin}$ and $p_{p,z}$ supplied by the block 503. This is explained further with respect to FIG. 10 hereinafter.

Figure 3:
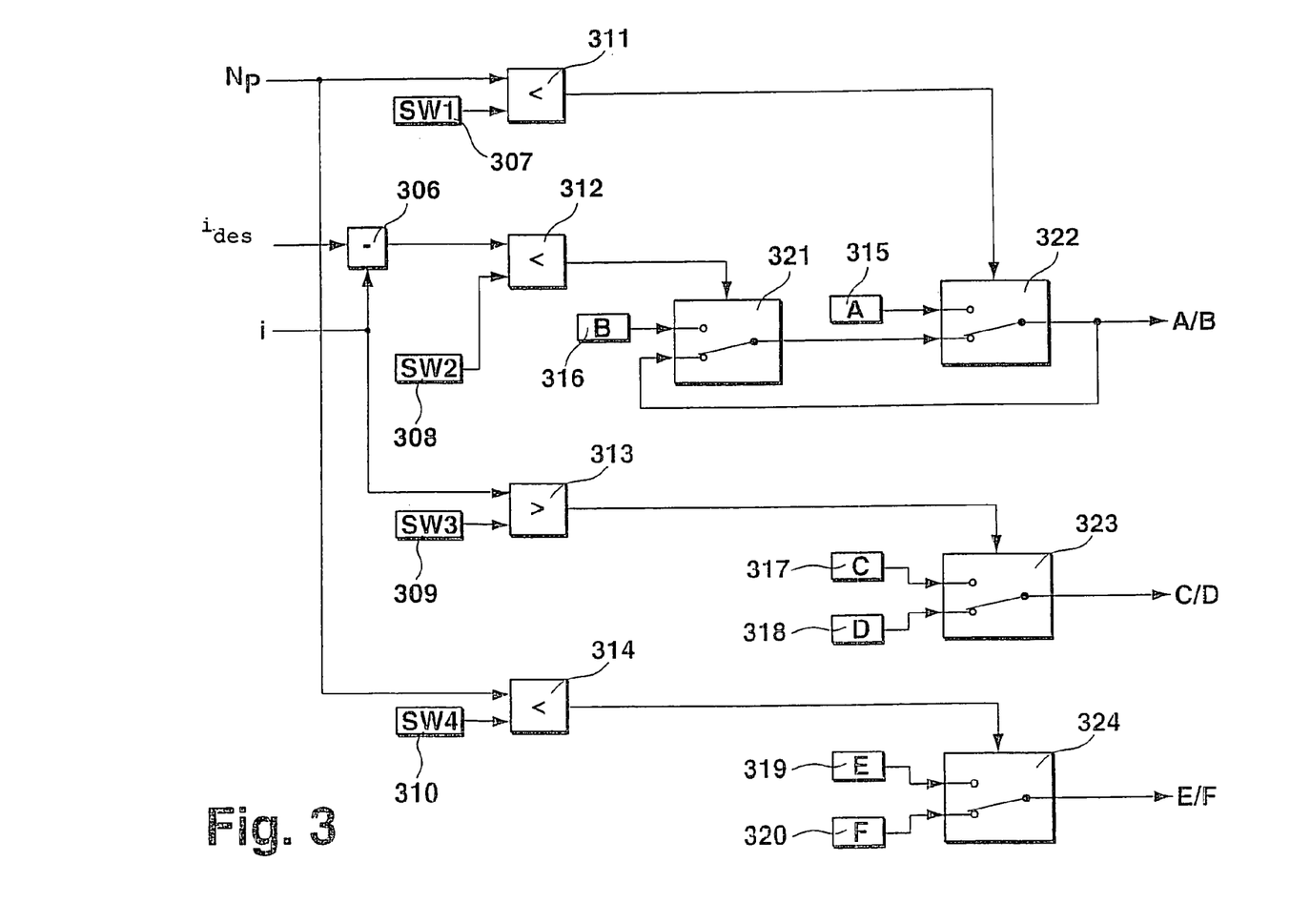

FIG. 3 shows an embodiment of the block 405 for determining the operating mode of the belt transmission. The block 405 forms a first state signal A/B which can assume either the value A or the value B and a second state signal C/D, which can assume either the value C or D, and a third state signal, which can assume either the value E or the value F. The first state signal is set to the value A when the instantaneous primary rpm $N_p$ is less than a threshold value SW1. This takes place via the threshold value storage 307 by means of the comparator 311. Depending upon the comparison 311, the switch 322 is switched over in such a manner that the signal value A (315) is present at the output end of block 405.

In block 306, the difference between the instantaneous transmission ratio i and the wanted transmission ratio ides is formed and is compared in block 312 to the threshold value SW2 (308).

If the difference, which is formed in block 312, drops below the threshold value SW2, then the switch 321 is switched over to the value B (316). If, at the same time, the instantaneous primary rpm $N_p$ exceeds the threshold value SW1 (see 311), then the switch 322 is connected to the switch 321 as shown in FIG. 3. When the primary rpm $N_p$ is therefore greater than the threshold value SW1 and, simultaneously, the difference between the instantaneous transmission ratio i and the desired transmission ratio $i_{des}$ is less than a threshold value SW2, then the first state signal is set to the value B. If this is not the case, then the state signal retains its previous state.

The second state signal C/D is set to the value C when the instantaneous transmission ratio i is greater than a threshold value SW3 (309). The threshold value comparator 313 and the circuit 323 or the stores 317 and 318 are provided for this purpose. If the instantaneous transmission ratio i drops below the threshold value SW3, the second state signal is set to the value D.

The third state signal E/F is set to the value E when the primary rpm $N_p$ is less than a threshold value SW4 (310). The threshold value comparator 314 and the switch 324 or the stores 319 and 320 function for this purpose. This means that the third state switch assumes the value E when the variator is almost at standstill. If the primary rpm $N_p$ exceeds the threshold value SW4, the third state signal is set to the value F.

In the control circuit 20 shown in FIG. 2a, the drive signal $I_b$ is further processed in the block 406 to the actual drive signal I for the primary valve 15, that is, for the magnet 16 of the primary valve. For this further processing, the state signals from the block 405, which was already described with respect to FIG. 3, are supplied to the block 406. These state signals can assume the signal value A or B, the signal value C or D and the signal value E or F. The block 406 supplies the final control signal I for the magnet 16 of the proportional valve 15, that is, the control signal I determines the position and therefore the opening cross section of the valve 15. The block 406 is shown in FIG. 4.

When the first state signal has the value A, the second state signal the value D and the third state signal the value F, then the current signal I is set to a value I1 (4045) whereat the proportional valve is closed. In this case, the instantaneous adjusted transmission ratio remains constant. The setting of the current signal to the value I1 takes place via a corresponding drive of the switches 4047, 4046 and 4048. This means that, for a variator not at standstill, no change of the transmission ratio takes place when the instantaneous primary rpm drops below the threshold value SW1 and the instantaneous transmission ratio i drops below the threshold SW3.

When the first state signal has the value A, the second state signal has the value C and the third state signal the value F, then the signal $I_b$ coming from block 403 is limited to an adjustable minimum value $I_{min}$ (4042) or an adjustable maximum value $I_{max}$ (4041). This limiting takes place via the maximum or minimum selection 4043 and 4044. This means that, in this case, the transmission ratio can be changed with limited speed.

If, for a variator, which is not a standstill (state signal E/F assumes the value F), the first state signal A/B has the value B, then the current signal $I_b$, which comes from the block 403, is not limited which is achieved by switching over the switch 4047. That is, in this case, the transmission ratio can be adjusted rapidly.

For a variator at standstill, the third state signal assumes the value E, that is, the current signal $I_b$, which comes from block 403, is not limited.

The control apparatus 20 includes a unit for adjusting the current via the valve 16 in correspondence to the wanted current I.

Figure 6:
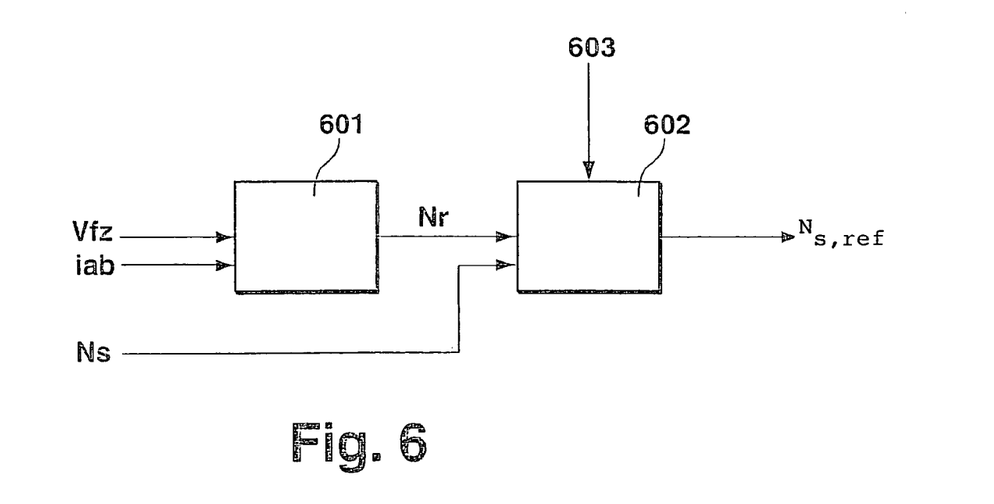

FIG. 6 shows a configuration of block 404 for forming the reference rpm $N_{s\ ref}$. In block 601, the vehicle speed $V_{Fz}$ is converted into a first reference rpm $N_r$. For this purpose, the determined transmission ratio $i_{ab}$ of the output of the transmission stage 33 is multiplied by the vehicle speed and a constant. The first reference rpm $N_r$, which is so determined, is transmitted to the block 602 which includes means for filtering the reference rpm, for example, a lowpass filter and upper and lower limits of the increase of the reference rpm. The filtering can furthermore be dependent upon still further signals 603 which represent a quantity which is dependent upon whether the vehicle is in an acceleration state or a deceleration state. Such a signal can, for example, be formed from the accelerator pedal position and the vehicle speed. The filter block can furthermore also consider the measured secondary rpm $N_s$ in such a manner that, under steady state conditions, the computed reference rpm $N_{s,ref}$ approaches the secondary rpm $N_s$.

Figure 5:
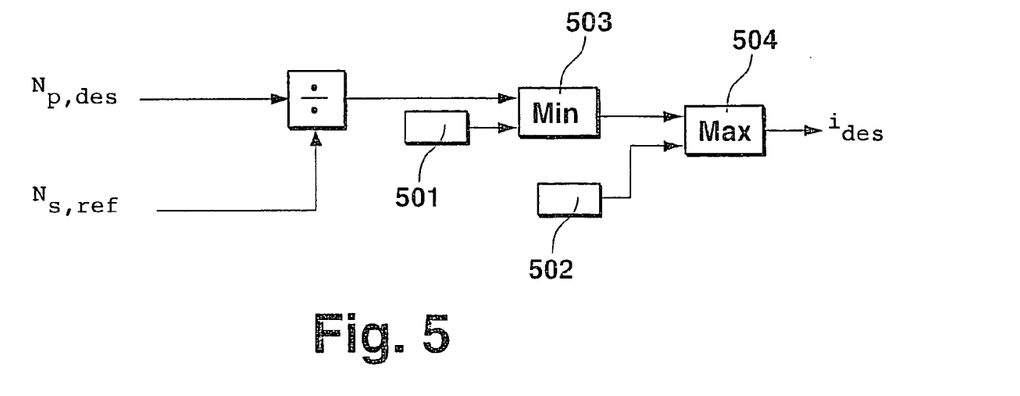

FIG. 5 shows a configuration of block 402. The wanted transmission ratio ides is formed by division of the desired primary rpm $N_{p,des}$ by the reference rpm $N_{s,ref}$:

$$i_{des} = N_{p,des}/N_{s,ref}$$

The desired transmission ratio $i_{des}$ is limited by the threshold comparisons 503 and 504 to the lower limit value 502 and to the upper limit value 501. With the use of the filtered reference rpm for determining the desired transmission ratio $i_{des}$, the influence of drive train vibrations on the transmission ratio control can advantageously be reduced.

Figure 7:
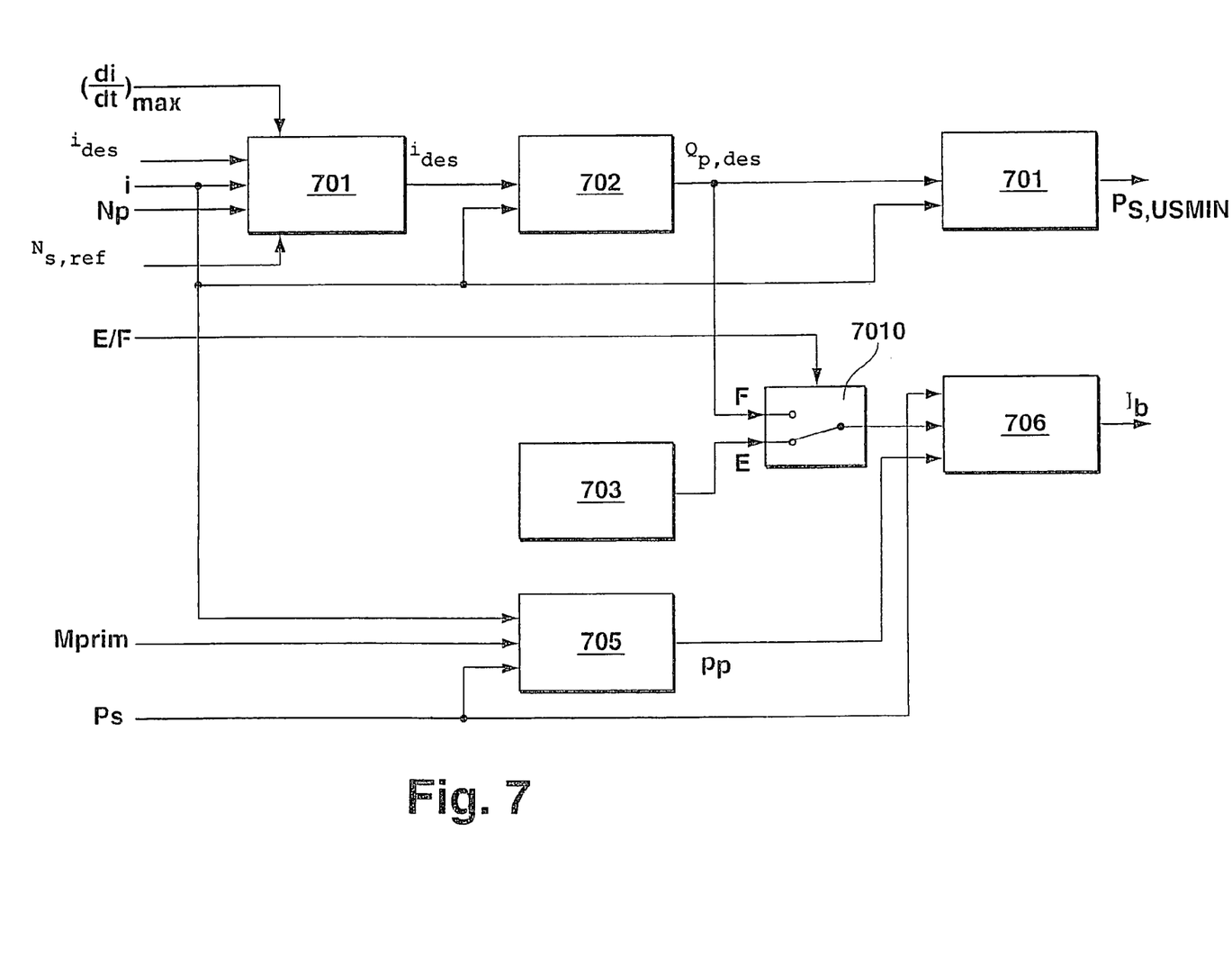

In FIG. 7, the central block 403 of FIG. 2a is shown in greater detail. Block 701 functions first to limit the desired transmission ratio $i_{des}$ and to avoid an unwanted overspeed of the primary rpm. For this purpose, the value for the maximum permissible transmission ratio gradient (di/dt) max can be applied which is transmitted to the block 701 from the block 504 of FIG. 2b. Block 701 first computes the transmission ratio gradient ($di_{des}/dt$) from the transmitted values for the wanted transmission ratio or the desired transmission ratio ides via differentiation. When the transmission ratio gradient ($di_{des}/dt$) is greater than the maximum permissible transmission ratio (di/dt)max, then block 701 computes a new value $i^*_{des}$ for the wanted ratio from the instantaneous transmission ratio i and the maximum permissible transmission ratio gradient (di/dt)max in accordance with the relationship:

$$i^*_{des} = i + (di/dt)\max * T.$$

wherein: T is the scanning time of the computation algorithm, that is, the time interval during which the computation is carried out.

Furthermore, block 701 checks whether the measured primary rpm $N_p$ exceeds a threshold value $N_{p,max}$. If this is the case, then the value $i^*_{des}$ for the wanted transmission ratio is steadily reduced.

Furthermore, block 701 checks whether the product of the value $i^*_{des}$ for the wanted transmission ratio and the secondary rpm $N_s$ is greater than a threshold value $N_{p,max}$. If this is the case, then the value $i^*_{des}$ is likewise computed anew from the quotient of the threshold value $N_{p,max}$ and the reference rpm $N_{s,ref}$.

The signal $i^*_{des}$ is formed by the block 701 and is transmitted to the block 702 with the instantaneous value for the transmission ratio i. Block 702 contains a PID-controller having a downstream linearization block and forms a signal y from the signal $i^*_{des}$ and the signal i with the aid of the PID-controller. The signal y represents the wanted speed or rapidity of the change of the transmission ratio or the wanted transmission ratio gradient. The signal y or a quantity derived therefrom is advantageously applied to the computation of the current $I_b$. In an especially advantageous embodiment, a signal for the wanted volume flow $Q_{p,des}$ into the primary fluid chamber 11 is computed from the signal y for the wanted speed of change of the ratio via multiplication by a characteristic value K(i), which is dependent upon the measured transmission ratio i and which is read out from a characteristic field. The volume flow $Q_{p,des}$ is given by:

$$Q_{p,des} = y * K(i).$$

The block 703 contains an algorithm for adjusting the wanted volume flow at standstill of the variator. The block 703 is active when the status signal E/F of the block 405 assumes the state E. Block 703 is then connected to block 706 via the switch 7010.

The block 705 computes the transmission ratio gradient (di/dt) from the transmitted value for the instantaneous transmission ratio i. An estimated primary pressure $p_p$ is determined from the following: the transmission ratio gradient (di/dt), the measured secondary pressure $p_s$ and the value for the primary-end acting torque $M_{prim}$ and, if required, further signals. The estimated primary pressure $p_p$ operates on the conical disc set 25 at the drive end and the value for the torque $M_{prim}$ is transmitted from block 501 in FIG. 2b. In the event that a primary pressure sensor is present, the primary pressure signal $p_p$ can also be measured.

When the status signal E/F of the block 405 assumes the value F, the switch 7010 connects the block 702 to the block 706. The block 706 then computes the control signal $I_b$ in accordance with a hydraulic model of the primary valve 15 from the following: the signal $Q_{p,des}$ for the wanted volume flow of the fluid into the primary fluid chamber 11; the signal for the secondary pressure $p_s$; and, a value for the primary pressure $P_p$ transmitted by the block 705.

Block 704 computes a minimum secondary pressure $p_{s,USMIN}$ from the signal $Q_{p,des}$ for the wanted volume flow and the signal i for the instantaneous transmission ratio. The minimum secondary pressure $p_{s,USMIN}$ is the secondary pressure acting at the output end and which must at least be made available in order to be able to realize the desired volume flow $Q_{p,des}$ with the primary valve 15 when there is a rapid upshifting. The secondary pressure $p_{s,USMIN}$ therefore defines a lower limit value below which the secondary pressure should not drop. If the secondary pressure would become less than the minimum secondary pressure $p_{s,USMIN}$, then the pressure difference at the primary valve 15 could become so small that the maximum opening cross section at the primary valve would no longer be sufficient in order to be able to still realize the desired volume flow. For a variator which is not at standstill, it is therefore advantageous to increase the secondary pressure at least to the value $p_{s,USMIN}$ in order to be able to still adjust the required volume flow with the primary valve 15 at the primary end 7. In an advantageous embodiment of the invention, the block 704 uses the following computation for forming the minimum secondary pressure $p_{s,USMIN}$:

$$p_{s,USMIN} = (Q_{p,des})^2 * K_{s,USMIN}(i),$$

wherein: $K_{s,USMIN}(i)$ is a parameter dependent upon the signal i for the transmission ratio.

Figure 8:
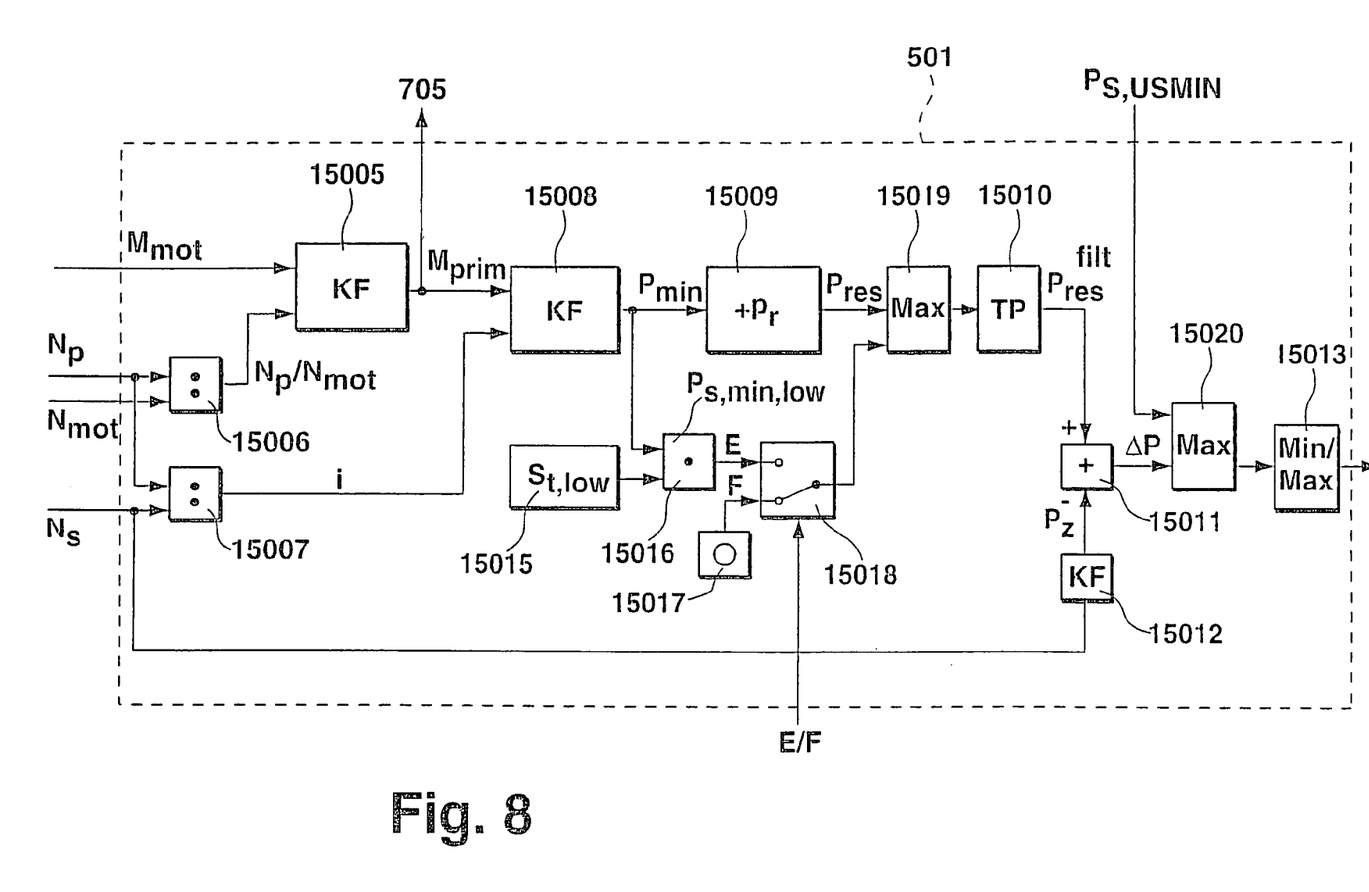

FIG. 8 shows a block 501 which undertakes a limiting of the desired secondary pressure $p_{des,sec}$ to the value $P_{s,USMIN}$. The block 501 shown in FIG. 1 is a modification of the belt tensioning controller of the belt part described in German patent application DE 195 48 722 A1. Accordingly, at this point, only the parts are explained which are changed in comparison to the tension controller shown there. As shown in FIG. 8, the signal $p_{s,USMIN}$ is applied in order to limit the value $P_{des,sec}$ to the lower value $p_{s,USMIN}$. The signal $P_{s,USMIN}$ is transmitted from the block 403 shown in FIG. 2a and the value $p_{des,sec}$ is outputted by the block 501. The above takes place by the comparator 15020.

The belt tension controller shown in FIG. 8 functions also to avoid slippage of the belt part with a variator at standstill, that is, for a vehicle at standstill and the occurrence of high torques to be transmitted. For the case of the variator at standstill, the state signal E/F is therefore used in order to set the switch 15018 to the value E so that the block 15019 transmits a value $P_{s,min,low}$. The value $P_{s,min,low}$ results from the signal $P_{min}$, which gives the minimum secondary pressure computed in the block 15008, via multiplication by a safety factor $S_{flow}$ in block 15016. In the position F, however, the value 0 is transmitted from the memory 15017 to the block 15019. Block 15019 supplies the greater of the two values $P_{s,min,low}$ and $P_{res}$ as an output signal. If the state signal indicates the value E, then the desired secondary pressure $P_{des,sec}$ is therefore limited to the value $P_{s,min,low}$ from which it can be assumed that this value is greater than the value $p_{s,USMIN}$. Stated otherwise, for a variator at standstill, a higher safety factor is realized for large torques than for a variator which is rotating.

The signal value for the secondary pressure $p_{des,sec}$ outputted by block 15013 is applied in order to correspondingly control the oil pressure at the secondary end with the pressure limiting valve 14.

Figure 9:
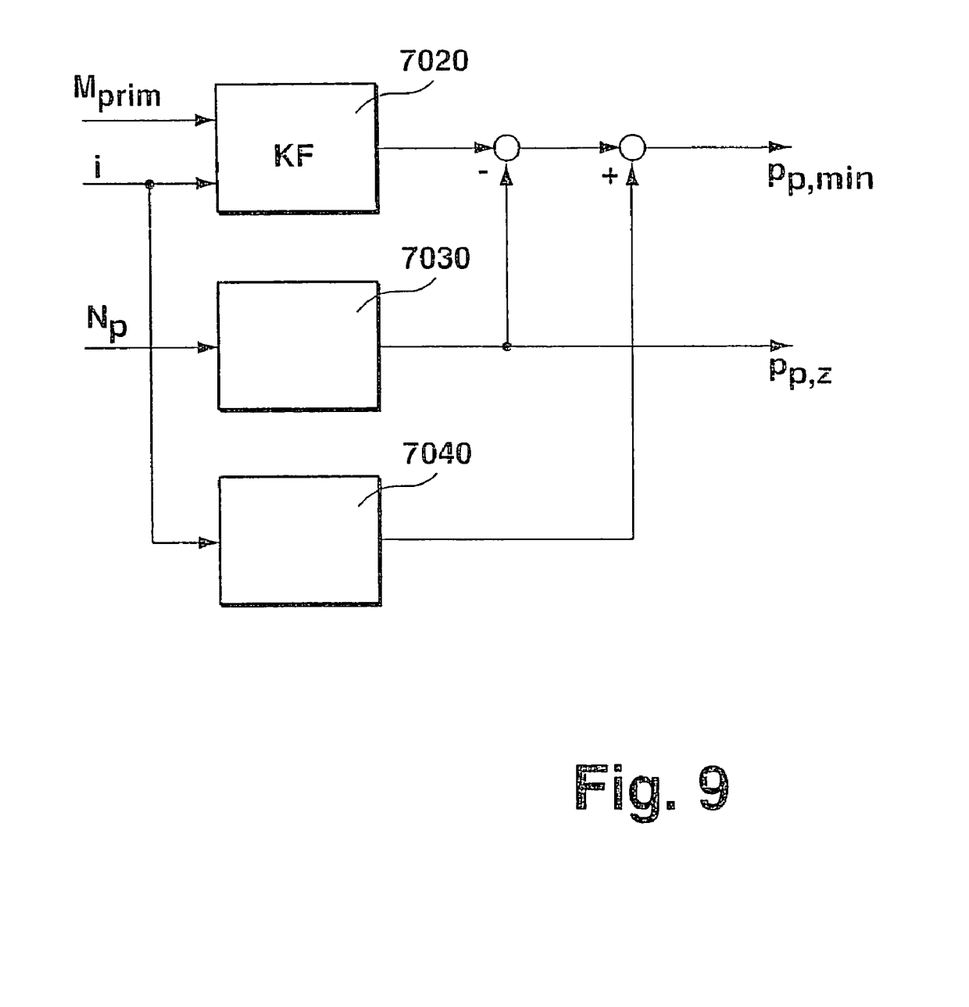

FIG. 9 shows a computation sequence, which is carried out in block 503 of FIG. 2b, for computing the minimum primary pressure $P_{p,min}$ which must at least be adjusted in order to avoid the slippage at the primary disc. The block 7020 computes a pressure signal from the primary torque signal $M_{prim}$ and the transmission ratio i with a characteristic field. From this, a value $p_{p,z}$ is subtracted which is computed from the value for the primary rpm $N_p$ with the block 7030. The primary pressure $p_{p,z}$ corresponds to the centrifugal contact forces in the primary fluid chamber 11. The block 7040 computes a reserve pressure which is added to the output signal of the block 7020. The reserve pressure is dependent upon the transmission ratio i. The result is a signal for the minimum primary pressure $P_{p, min}$.

Figure 10:
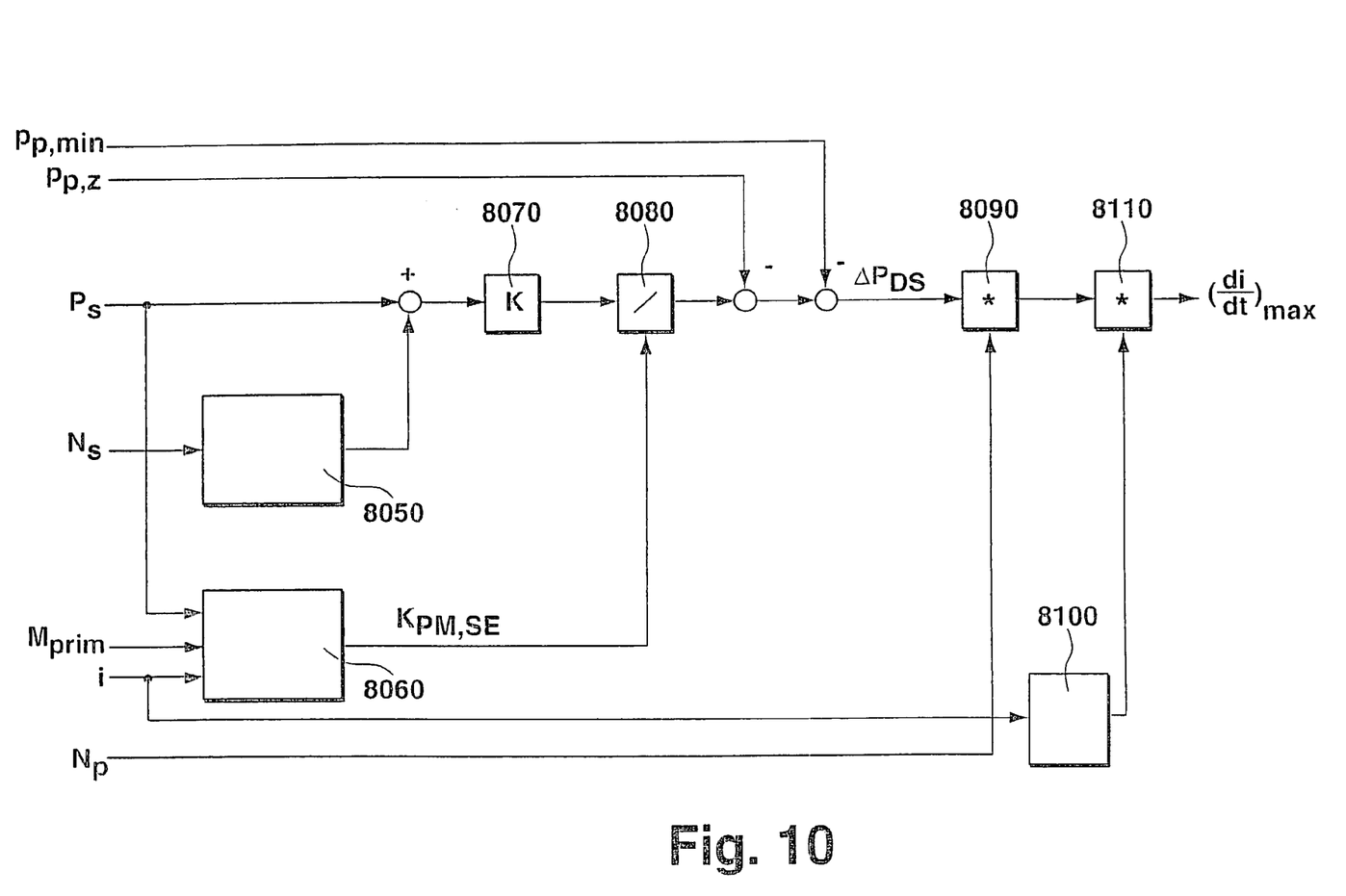

FIG. 10 shows a computation sequence which is carried out in block 504 in FIG. 2b. The block 8050 in FIG. 10 computes a secondary pressure from the secondary rpm $N_s$. This secondary pressure corresponds to the centrifugal contact forces in the secondary fluid chamber 12. This value is added to the measured value for the secondary pressure $p_s$. The sum is multiplied by a factor k in block 8070 and is divided in block 8080 by a value $K_{PM,SE}$ which is computed in block 8060 from the values for $M_{prim}$, $P_s$ and i. The value $K_{PM,SE}$ indicates the ratio of primary to secondary contact force in the steady state operation. The result from block 8080 is reduced by the value for the primary pressure $p_{p,z}$ for the centrifugal contact force and the minimum primary pressure $p_{p,min}$ with both values being supplied by the block 503 in FIG. 2b. The result is the primary pressure difference $\Delta p_{DS}$ which is maximally available for a downshift. The value for the primary pressure difference $\Delta p_{DS}$ is multiplied in block 8090 by the primary rpm $N_p$ and, in block 8110, by a value dependent upon the transmission ratio i which was determined in block 8100. The result which is supplied by block 8110, is the maximum transmission ratio gradient (di/dt)max which is transmitted to the block 701 in FIG. 7.

The invention claimed is:

1. A control circuit for generating a control signal (I) for controlling the transmission ratio of a belt transmission of a vehicle, the belt transmission being adjustable continuously with respect to its transmission ratio, the belt transmission including a drive end, an output end and a primary valve driven by the control signal (I) for adjusting the transmission ratio, the control circuit comprising:
   means for receiving operating parameters of said vehicle;
   means for generating said control signal (I) in dependence upon a value (y) for a wanted speed of the transmission ratio change or a quantity derived therefrom;
   means for calculating said value (y) from said operating parameters transmitted to the control circuit; and,
   wherein a value ($Q_{p,des}$) is calculated as a derived quantity from the value (y) for the wanted speed of the transmission ratio change and, if required, additional operating parameters; the value ($Q_{p,des}$) representing a wanted volume flow of a fluid into a primary fluid chamber of the drive end; and, the control signal (I) being generated in dependence upon the value ($Q_{p,des}$) for the volume flow.

2. The control circuit of claim 1, wherein the value (y) for the wanted speed of the transmission ratio change is determined in dependence upon a desired transmission ratio ($i^*_{des}$) computed by the control circuit from the operating parameters.

3. The control circuit of claim 2, wherein the value ($i^*_{des}$) for the desired transmission ratio is computed in dependence upon a value (dI/dt)max for the maximum permissible transmission ratio gradient, the value ($i^*_{des}$) being applied for the formation of the value (y) of the desired speed of the transmission ratio and the value (dI/dt)max being computed from the operating parameters.

4. The control circuit of claim 2, wherein the value ($i^*_{des}$) for the desired transmission ratio is computed in dependence upon a value for a desired primary rpm ($N_{p,des}$), said value being computed in dependence upon the operating parameters and the value ($i^*_{des}$) being applied for the formation of the value (y) of the wanted speed of the transmission ratio change.

5. The control circuit of claim 4, wherein the desired primary rpm ($N_{p,des}$) is determined in dependence upon the following: an operating parameter representing the vehicle speed ($V_{Fz}$) and an operating parameter representing the position (a) of the accelerator pedal.

6. The control circuit of claim 2, wherein the value ($i^*_{des}$) for the desired transmission ratio is formed in dependence upon a reference rpm ($N_{s,ref}$), the value ($i^*_{des}$) being applied for the formation of the value (y) of the wanted speed of the transmission ratio change.

7. The control circuit of claim 6, wherein the reference rpm ($N_{s,ref}$) is computed in dependence upon an operating parameter which represents the vehicle speed ($V_{Fz}$) and an operating parameter which represents the secondary rpm ($N_s$).

8. The control circuit of claim 1, wherein the value (y) for the wanted speed of the transmission ratio change is determined in dependence upon a state signal (E/F), which is determined in dependence upon the operating parameters and which signal describes the movement state (standstill or not at standstill) of a variator of the belt transmission.

9. The control circuit of claim 1, wherein the value for the wanted volume flow ($Q_{p,des}$) into the primary fluid chamber is computed from the value (y) for the wanted speed of the change of the transmission ratio via multiplication by a characteristic value K(i) read out from the characteristic field and dependent upon the measured transmission ratio (i).

10. The control circuit of claim 1, wherein a value ($p_{s,USMIN}$) for a minimum secondary pressure is detected in dependence upon the value (y) for the wanted speed of the transmission ratio change or the quantity derived therefrom and a value (i) for the instantaneous transmission ratio, the value ($P_{s,USMIN}$) representing the secondary pressure acting upon the output end which must at least be made available in order to be able to realize a wanted primary end volume flow ($Q_{p,des}$).

11. The control circuit of claim 10, wherein the value ($P_{s,USMIN}$) for the minimum secondary pressure is computed in dependence upon the square of the desired primary end volume flow ($Q_{p,des}$) and a value $K_{s,USMIN}(i)$ which is dependent upon the instantaneous transmission ratio (i).

12. A method for generating a control signal (I) for controlling the transmission ratio adjustment of a belt transmission adjustable continuously with respect to its transmission ratio, the belt transmission being of a vehicle and having a drive end, an output end and a primary valve for adjusting the transmission ratio, the primary valve being driven by the control signal (I) from a control circuit; the method comprising the steps of:
   generating a control signal (I) in dependence upon a value (y) for a wanted speed of the transmission ratio change or a quantity derived therefrom;
   detecting operating parameters of said vehicle and transmitting said operating parameters to said control circuit;
   calculating said value (y) for the wanted speed of the transmission ratio change from said operating parameters; and,
   calculating a value ($Q_{p,des}$) from the value (y) for the wanted speed of the transmission ratio change and, if required, further operating parameters; said value ($Q_{p,des}$) representing a desired volume flow of a fluid into a primary fluid chamber of the drive end; and, the control signal (I) being generated in dependence upon the value ($Q_{p,des}$) for the volume flow.

13. The method of claim 12, wherein the value (y) for the wanted speed of the transmission ratio change is determined in dependence upon a desired transmission ratio ($i^*_{des}$) computed by the control circuit from the operating parameters.

14. The method of claim 13, wherein the value ($i^*_{des}$) for the desired transmission ratio is computed in dependence upon a value (dI/dt)max for the maximum permissible transmission ratio gradient, the value (dI/dt)max being computed from the operating parameters and the value ($i^*_{des}$) being applied for the formation of the value (y) of the wanted speed of the transmission ratio change.

15. The method of claim 13, wherein the value ($i^*_{des}$) for the desired transmission ratio is computed in dependence upon a value for a desired primary rpm ($N_{p,\ den}$) which represents a desired transmission ratio of the variator, said value for the desired primary rpm ($N_{p,des}$) being computed from the operating parameters; and, said value ($i^*_{des}$) being applied for the formation of the value (y) of the wanted speed of the transmission ratio change.

16. The method of claim 12, wherein the value (y) for the wanted speed of the transmission ratio change is determined in dependence upon a state signal (E/F) which is determined from the operating parameters; said state signal defines the movement state (standstill or not at standstill) of a variator of the belt transmission.

17. The method of claim 12, wherein the value for the wanted volume flow ($Q_{p,des}$) into the primary fluid chamber is computed from the value (y) for the wanted speed of change of the transmission ratio via multiplication by a characteristic value K(i) which is read out of a characteristic field and is dependent upon the measured transmission ratio (i).

18. The method of claim 12, wherein a value ($P_{s,USMIN}$) for a minimum secondary pressure is detected in dependence upon the value (y) for the wanted speed of the transmission ratio change or from the quantity derived therefrom and a value (i) for the instantaneous transmission ratio; and, said minimum secondary pressure representing the secondary pressure acting on the output end which must be made available in order to realize a desired primary end volume flow ($Q_{p,des}$).

19. The method of claim 18, wherein the value ($P_{s,USMIN}$) for the minimum secondary pressure is computed in dependence upon the square of the desired primary end volume flow ($Q_{p,des}$) and a value $K_{s,USMIN}(i)$ dependent upon the instantaneous transmission ratio (i).

* * * * *

UNITED STATES PATENT AND TRADEMARK OFFICE
CERTIFICATE OF CORRECTION

PATENT NO. : 7,121,967 B2  
APPLICATION NO. : 10/469413  
DATED : October 17, 2006  
INVENTOR(S) : Joachim Luh It is certified that error appears in the above-identified patent and that said Letters Patent is hereby corrected as shown below:

Column 10:  
Line 5: Delete " (a) " and substitute -- ($\alpha$) -- therefor.

Signed and Sealed this

Ninth Day of January, 2007

JON W. DUDAS  
*Director of the United States Patent and Trademark Office*